United States Patent
Kimura et al.

(10) Patent No.: US 8,715,857 B2
(45) Date of Patent: May 6, 2014

(54) NEGATIVE ELECTRODE ACTIVE MATERIAL FOR LITHIUM ION BATTERY, AND NEGATIVE ELECTRODE FOR LITHIUM ION BATTERY USING THE SAME

(71) Applicants: Yuta Kimura, Aichi (JP); Yuichiro Tago, Aichi (JP); Kozo Ozaki, Aichi (JP)

(72) Inventors: Yuta Kimura, Aichi (JP); Yuichiro Tago, Aichi (JP); Kozo Ozaki, Aichi (JP)

(73) Assignee: Daido Steel Co., Ltd., Nagoya, Aichi (JP)

( * ) Notice: Subject to any disclaimer, the term of this patent is extended or adjusted under 35 U.S.C. 154(b) by 0 days.

(21) Appl. No.: 13/631,530

(22) Filed: Sep. 28, 2012

(65) Prior Publication Data

US 2013/0084498 A1 Apr. 4, 2013

(30) Foreign Application Priority Data

Sep. 30, 2011 (JP) ................................ 2011-218480
Mar. 14, 2012 (JP) ................................ 2012-058014

(51) Int. Cl.
*H01M 4/13* (2010.01)
*H01M 4/88* (2006.01)

(52) U.S. Cl.
USPC ...................... 429/223; 429/218.1; 252/182.1

(58) Field of Classification Search
None
See application file for complete search history.

(56) References Cited

FOREIGN PATENT DOCUMENTS

| JP | 2002-124254 A | | 4/2002 |
| JP | 2006-172777 A | | 6/2006 |
| JP | 2007-149604 | * | 6/2007 |
| JP | 2009-032644 A | | 2/2009 |
| JP | 2011-032541 A | | 2/2011 |

OTHER PUBLICATIONS

Machine translation of JP 2007-149604, retrieved from <http://www19.ipdl.inpit.go.jp/PA1/cgi-bin/PA1DETAIL> on Jun. 28, 2013.*

* cited by examiner

*Primary Examiner* — Cynthia K. Walls
(74) *Attorney, Agent, or Firm* — McGinn IP Law Group, PLLC

(57) ABSTRACT

The present invention relates to a negative electrode active material including an Si—Sn—Fe—Cu based alloy, in which an Si phase has an area ratio in a range of from 35 to 80% in the entire negative electrode active material, the Si phase is dispersed in a matrix phase, the matrix phase contains an Si—Fe compound phase crystallized around the Si phase and further contains an Sn—Cu compound phase crystallized to surround the Si phase and the Si—Fe compound phase, the Si—Fe compound phase is crystallized in a ratio of from 35 to 90% in terms of an area ratio in the entire matrix phase, and the matrix phase further contains an Sn phase unavoidably crystallized in the matrix phase in a ratio of 15% or less in terms of an area ratio in the entire matrix phase.

8 Claims, 4 Drawing Sheets

FIG. 1A STRUCTURE MICROGRAPH OF EXAMPLE 7
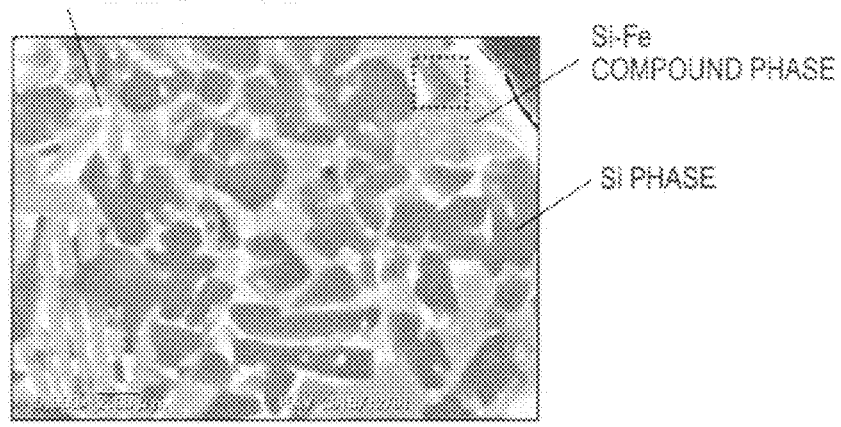
FIG. 1B STRUCTURE MICROGRAPH OF COMPARATIVE EXAMPLE 1
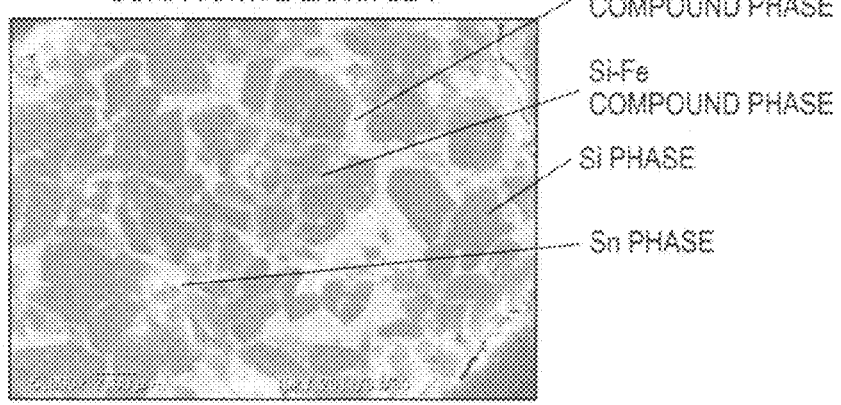
FIG. 1C ENLARGED SCHEMATIC ILLUSTRATION OF STRUCTURE
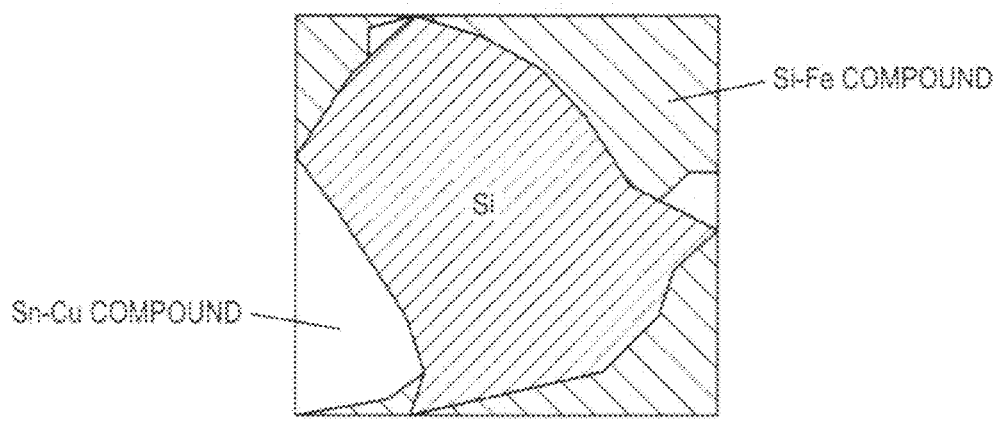

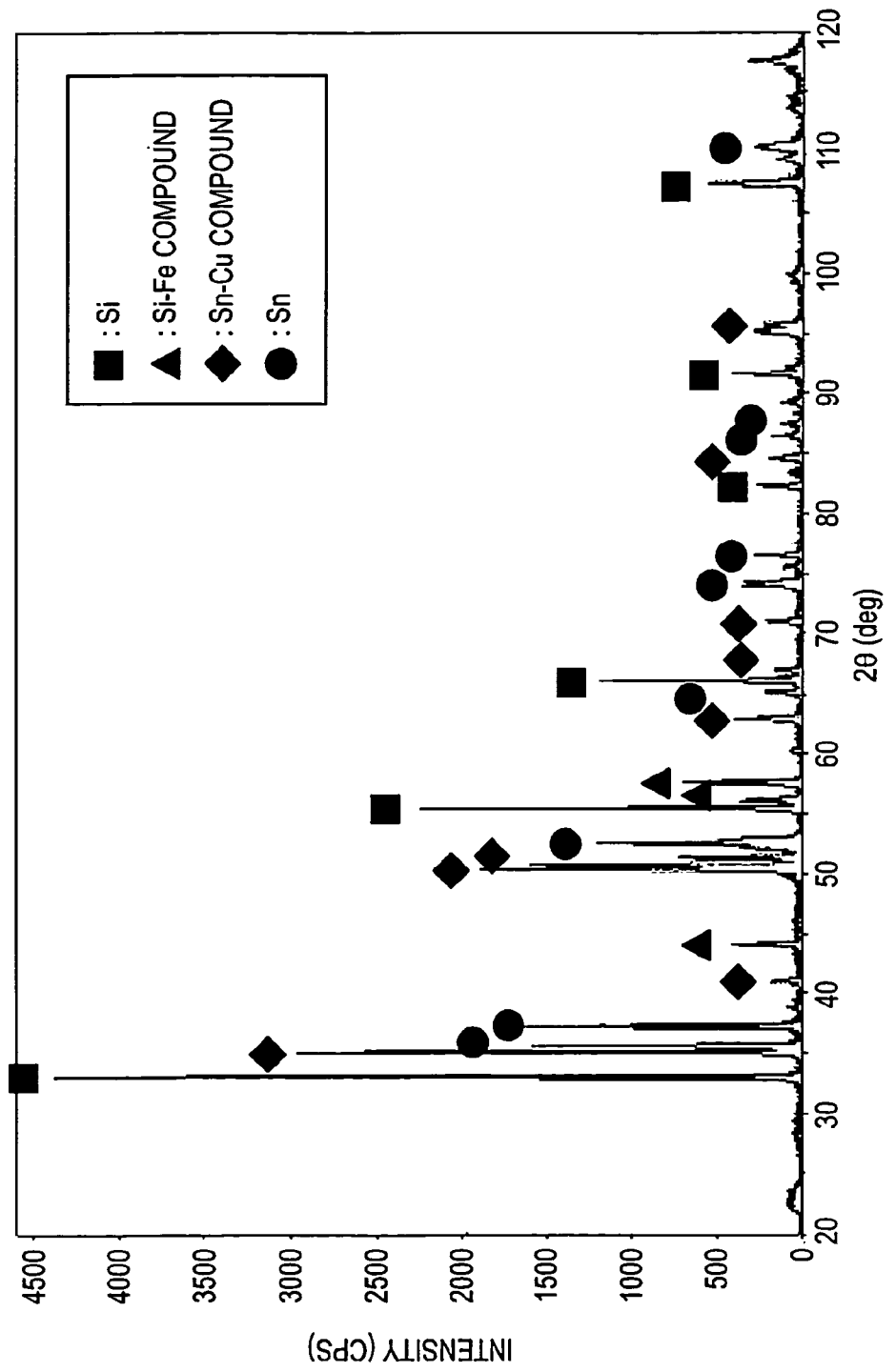

NEGATIVE ELECTRODE ACTIVE MATERIAL FOR LITHIUM ION BATTERY, AND NEGATIVE ELECTRODE FOR LITHIUM ION BATTERY USING THE SAME

FIELD OF THE INVENTION

The present invention relates to a negative electrode active material for a lithium ion battery and a negative electrode for a lithium ion battery using the same.

BACKGROUND OF THE INVENTION

A lithium ion battery has been widely used as a power supply for a mobile telephone, a notebook computer and the like owing to the advantages thereof including a large capacity, a high voltage and a capability of miniaturization. A lithium ion battery has also been greatly expected in recent years as a power supply for power electronics including an electric vehicle and a hybrid vehicle, and has been developed actively.

A lithium ion battery performs battery charge and discharge through migration of lithium ions between a positive electrode and a negative electrode, and in the negative electrode, a negative electrode active material absorbs lithium ions upon battery charge and discharges lithium ions upon battery discharge.

In general, lithium cobaltate ($LiCoO_2$) has been used as the active material of the positive electrode, and graphite has been used as the negative electrode active material.

However, graphite, which has been widely used as the negative electrode active material, has a theoretical capacity of only 372 mAh/g, and increase of the capacity has been demanded. As an alternative material of the carbonaceous negative electrode active material, metallic materials, such as Si and Sn, which are expected to have a large capacity have been actively investigated, However, Si and Sn absorb lithium ions through alloying reaction with lithium and undergo large expansion and contraction in volume associated with absorption and discharge of lithium ions.

Accordingly, the sole use of Si or Sn for constituting the negative electrode active material provides a problem that particles of Si or Sn are broken or drop-off from the collector due to the stress caused by the expansion and contraction, which deteriorates the cycling characteristics, i.e., the maintenance of the capacity on repeated battery charge and discharge.

As a countermeasure therefor, Patent Document 1 discloses that Si is alloyed to provide a negative electrode active material having such a structure that a large number of Si nuclei are each surrounded by an Al—Co based alloy matrix phase, by which the expansion and contraction stress of the Si phase is relaxed with the matrix phase, thereby improving the cycling characteristics.

Patent Document 1 also discloses that an alloy melt is quenched to provide an Si based amorphous alloy, which is then heat treated to deposit fine crystalline Si nuclei, thereby providing a negative electrode active material for a lithium secondary battery having a fine structure including the $Si$ nuclei and an alloy matrix formed through phase separation from Si upon quenching solidification.

However, the technique disclosed in Patent Document 1 still has room for improvement as follows.

In the structure having an Si phase surrounded by an Al—Co based alloy matrix phase, the Al alloy has slight Li activity but fails to function sufficiently as an Li diffusion path (the Al alloy substantially does not absorb Li), and the capacity utilization factor with respect to the theoretical capacity of the active material is low to fail to enhance the initial discharge capacity. Furthermore, upon using the Al alloy as the matrix phase, the cycling characteristics may certainly be improved, but there is a difficulty in further enhancement of the cycling characteristics.

It is considered that the aforementioned problems may be caused by the factors shown below.

The Al alloy substantially does not absorb Li as described above, and therefore, in the case where the Al alloy is used as the matrix phase surrounding the Si phase, the expansion of the matrix phase itself at the time of the volume expansion of the Si phase is small and thus becomes broken because the matrix phase cannot endure the expansion stress of the Si phase, resulting in difficulty in further enhancement of the cycling characteristics.

Patent Document 2 discloses a lithium secondary battery having a large capacity and enhanced cycling characteristics, and Patent Document 3 discloses a negative electrode active material for a lithium battery having enhanced cycling characteristics while maintaining a large discharge capacity.

However, Patent Documents 2 and 3 do not disclose a negative electrode active material having a structure containing an Si phase as a nuclei and a matrix composed of an Si—Fe compound phase and an Sn—Cu compound phase crystallized to surround the nuclei.

Patent Document 4 discloses nanosize particles, a negative electrode material for a lithium ion secondary battery that contains the nanosize particles, a negative electrode for a lithium ion secondary battery, a lithium ion secondary battery, and a method for producing the nanosize particles, which intends to provide a negative electrode material for a lithium ion secondary battery that achieves a large capacity and good cycling characteristics.

Patent Document 4 discloses in Example in Table 1 an example of an active material containing an Si—Sn—Cu—Fe quaternary alloy.

However, this active material does not have a structure containing an Si phase as a nuclei and a matrix composed of an Si—Fe compound phase and an Sn—Cu compound phase crystallized to surround the nuclei, and thus is different from the present invention.

Patent Document 1: JP-A-2009-32644
Patent Document 2: JP-A-2006-172777
Patent Document 3:JP-A-2002-124254
Patent Document 4: JP-A-2011-32541

SUMMARY OF THE INVENTION

The invention has been developed under the circumstances, and an object thereof is to provide a negative electrode active material for an lithium ion battery that is capable of making an initial discharge capacity of the active material large and is especially capable of enhancing cycling characteristics, and to provide a negative electrode for a lithium ion battery using the same.

Namely, the present invention provides the followings,

1, A negative electrode active material comprising an Si—Sn—Fe—Cu based alloy,
wherein an Si phase has an area ratio in a range of from 35 to 80% in the entire negative electrode active material,
wherein the Si phase is dispersed in a matrix phase,
wherein the matrix phase contains an Si—Fe compound phase crystallized around the Si phase and further contains an Sn—Cu compound phase crystallized to surround the Si phase and the Si—Fe compound phase, wherein the Si—Fe compound phase is crystallized in a ratio of from 35 to 90% in terms of an area ratio in the entire matrix phase, and wherein the matrix phase further contains an Sn phase unavoidably crystallized in the matrix phase in a ratio of 15% or less in terms of an area ratio in the entire matrix phase.

2. The negative electrode active material according to item 1 above, wherein the area ratio of the Si—Fe compound phase in the entire matrix phase is in a range of from 60 to 85%.

3. The negative electrode active material according to item 1 or 2 above, wherein the area ratio of the Si phase in the entire negative electrode active material is in a range of from 50 to 80%.

4. A negative electrode for a lithium ion battery, comprising the negative electrode active material according to any one of items 1 to 3 above formed into a fine powders having an average particle diameter of from 1 to 10 μm and a polyimide binder as a binder for binding the negative electrode active material.

According to the first aspect of the invention, a negative electrode active material is formed of an Si—Sn—Fe—Cu based alloy, in which an Si phase has an area ratio in a range of from 35 to 80% in the entire negative electrode active material; the Si phase is dispersed in a matrix phase; an Si—Fe compound phase is crystallized around the Si phase and an Sn—Cu phase is further crystallized to surround the Si phase and the Si—Fe compound phase, respectively, as the matrix phase; the Si—Fe compound phase is crystallized in a ratio of from 35 to 90% in terms of an area ratio in the entire matrix phase; and an Sn phase unavoidably crystallized in the matrix phase is in a ratio of 15% or less in terms of an area ratio in the entire matrix phase.

By making the negative electrode active material as mentioned above, the capacity utilization factor with respect to the theoretical capacity of the active material can be increased, and the cycling characteristics of the active material can be largely enhanced.

In the negative electrode active material according to the first aspect, the Sn—Cu compound phase as the matrix phase has the following functions.

For example, when Si having a large Li absorbing capability forms a compound (intermetallic compound), the compound substantially loses the Li absorbing capability.

On the other hand, even when Sn also having a large Li absorbing capability forms a compound, the compound does not lose the Li absorbing capability but has an Li absorbing capability corresponding to the Sn content of the compound.

Accordingly, the Sn—Cu compound phase as the matrix phase has an Li absorbing capability corresponding to the Sn content thereof and thus has a high function as an Li diffusion path.

Consequently, the negative electrode active material of the invention using the Sn—Cu compound phase as the matrix phase has a large capacity utilization factor with respect to the theoretical capacity of Si and thus is capable of increasing the initial discharge capacity.

The Sn—Cu compound phase also has a function of enhancing the cycling characteristics. It is considered that the function is provided by the following mechanism.

The Sn—Cu compound phase as the matrix phase has an Li absorbing capability and thus the Sn—Cu compound itself is expanded in a certain extent when the Si phase contained inside the Sn—Cu compound phase in a dispersed state is expanded through absorption of Li.

Owing to the expansion of itself, the Sn—Cu compound phase thus absorbs and relaxes the expansion stress upon expansion of the Si phase. Accordingly, the Si phase can be prevented from suffering cracks and breakage due to the volume expansion of the Si phase, and also the Sn—Cu matrix phase itself can be prevented from suffering breakage due to the volume expansion of the Si phase.

Furthermore, even when the Si phase is cracked or broken, such Si phase can be retained inside the matrix phase, thereby preventing deterioration of the cycling characteristics due to breakage of the Si phase.

The negative electrode active material of the invention further includes as another matrix phase an Si—Fe compound phase crystallized around the Si phase, thereby enhancing the cycling characteristics more effectively.

The Si—Fe compound phase does not substantially absorb Li, which is different from the Sn—Cu compound phase, and the Si—Fe compound phase crystallized around the Si phase exhibits such a function that upon expansion of the Si phase through absorption of Li, the Si—Fe compound phase suppresses the expansion itself of the Si phase, It is considered that the cycling characteristics are further enhanced by the function of Si—Fe compound phase that suppresses the expansion itself of the Si phase, the function of the Sn—Cu compound phase that relaxes the expansion stress of the Si phase, and the function of Sn—Cu compound phase that suppresses the breakage of itself.

In the negative electrode active material of the invention, the Si—Fe compound phase is crystallized in a ratio (crystallization ratio, area ratio) of from 35 to 90% in terms of an area ratio in the entire matrix phase.

The inventors have confirmed that in the case where the Si—Fe compound phase is crystallized around the Si phase, the increase of the crystallized amount thereof enhances the cycling characteristics, but when the crystallized amount of the Si—Fe compound phase exceeds a certain value, the cycling characteristics may be deteriorated, and the suitable range thereof is from 35 to 90% in terms of area ratio, The crystallization ratio of the Si—Fe compound phase in a range of from 35 to 90% facilitates the target capacity retention ratio, 70% or more after 50 cycles.

It is considered that the crystallization ratio of the Si—Fe compound phase in a range of from 35 to 90% enhances the cycling characteristics by the following mechanism.

When the crystallization ratio of the Si—Fe compound phase is less than 35%, the function of the Si—Fe compound phase that suppresses the expansion of the Si phase is insufficient, while when the crystallization ratio thereof exceeds 90%, the proportion of the Si—Fe compound phase occupied in the entire matrix phase becomes too large, and consequently the matrix phase having a decreased expansion capability is broken by the volume expansion of the Si phase, thereby deteriorating the cycling characteristics.

The area ratio of the Si—Fe compound phase is preferably in a range of from 60 to 85% (the second aspect).

The area ratio of the Si—Fe compound phase within this range facilitates the more favorable target capacity retention ratio, 80% or more after 50 cycles, and thus the cycling characteristics are further enhanced.

In the negative electrode active material of the invention, an Sn phase unavoidably crystallized in the matrix phase is controlled to be 15% or less in terms of an area ratio in the entire matrix phase.

The Sn phase, which is solely crystallized without formation of a compound, undergoes large expansion upon absorbing Li, and when the amount thereof exceeds 15% in terms of the area ratio, the Sn phase diminishes the aforementioned advantages provided by the matrix phase. In the invention, accordingly, the amount of the Sn phase is 15% or less in terms of the area ratio.

In the negative electrode active material of the invention, the Si phase is controlled to be in a range of from 35 to 80% in terms of an area ratio in the entire negative electrode active material.

When the area ratio of the Si phase is less than 35%, the capacity of the negative electrode active material is decreased to fail to provide the target initial discharge capacity, 500 mAh/g, and thus the resulting battery may not have a large capacity.

When the area ratio of the Si phase exceeds 80%, on the other hand, the relative amount of the matrix phase is decreased, and the aforementioned advantages of the matrix phase are reduced, thereby deteriorating the cycling characteristics.

In the invention, the area ratio of the Si phase in the entire negative electrode active material is preferably in a range of from 50 to 80% (the third aspect).

The area ratio of the Si phase within this range facilitates the more favorable target initial discharge capacity, 1,000 mAh/g.

The negative electrode active material of the invention may be obtained by liquid-cooling and solidifying an alloy melt.

In this case, Si having the highest melting point is firstly crystallized in the process of cooling and solidifying an alloy melt, then the Si—Fe compound phase is crystallized, and then the Sn—Cu compound phase is crystallized sequentially.

According to the method, the Si—Fe compound phase is crystallized around the Si phase having been firstly crystallized as nuclei, and then the Sn—Cu phase is crystallized to surround the entire of the Si phase and the Si—Fe phase, thereby facilitating the formation of the negative electrode active material of the invention having two-phase matrix structure, According to the fourth aspect of the invention, a negative electrode for a lithium ion battery is provided, in which the negative electrode active material formed into a fine powder having an average particle diameter of from 1 to 10 µm is used and a polyimide binder is used as a binder for binding the negative electrode active material.

Even in the case where not an elementary substance of Si but an Si alloy is used as a negative electrode active material, the active material itself undergoes volume expansion and contraction associated with battery charge and discharge, which generates stress inside the composition layer containing the negative electrode active material bound with a binder, i.e., inside the electroconductive film.

In this case, when the binder fails to withstand the stress and the binder is broken, drop-off of the electroconductive film from the collector is caused, and as a result, the electroconductivity in the electrode is lowered, and the charge and discharge cycling characteristics are deteriorated.

According to the fourth aspect of the invention, it is considered that the use of the fine powder of the negative electrode active material having an average particle diameter of from 1 to 10 µm increases the contact area with the binder through miniaturization of the active material, and the synergistic effect with the use of the polyimide binder having large mechanical strength as a binder favorably suppresses breakage of the binder, thereby enhancing the cycling characteristics.

BRIEF DESCRIPTION OF THE DRAWINGS

FIGS. 1A and 1B are secondary electron images by a scanning electron microscope (SEM) of the negative electrode active materials of Example 7 and Comparative Example 1, and FIG. 1C is an enlarged schematic illustration of a part of FIG. 1A.

FIG. 2 is a graph showing results of XRD analysis.

BEST MODE FOR CARRYING OUT THE INVENTION

Figure 3B:
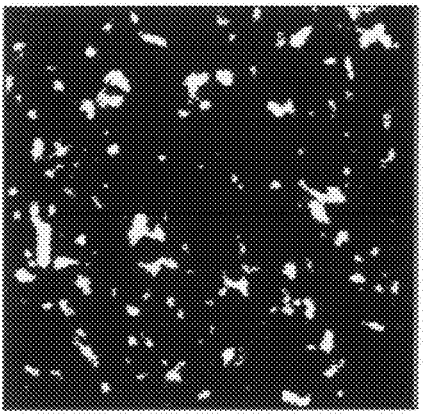
FIGS. 3A to 3D are image analysis results and a secondary electron image by SEM of the negative electrode active material of Example 7.
Figure 3D:
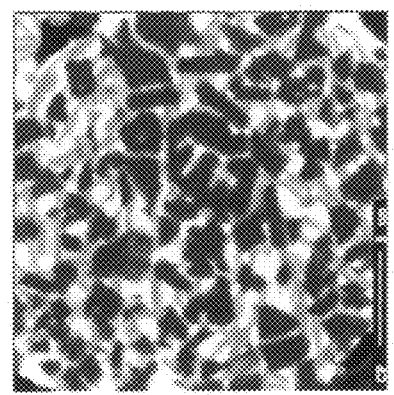

The negative electrode active material for a lithium ion battery according to one embodiment (which may be hereinafter referred simply to "negative electrode active material"), and the negative electrode for a lithium ion battery using the negative electrode active material according to one embodiment (which may be hereinafter referred simply to "negative electrode") will be described in detail below.

1. Negative Electrode Active Material

In the negative electrode active material, the crystallites forming the Si phase mainly contain Si. The crystallites are preferably constituted by a single phase of Si from the standpoint of enhancement of the lithium absorbing amount, but the Si phase may contain unavoidable impurities.

The shape of the Si crystallites is not particularly limited, and the outer shape thereof may be relatively uniform or may be random. The individual Si crystallites may be separated from each other, or the Si crystallites may be partially connected to each other.

The upper limit of the size of the Si crystallites is preferably 1.5 µless, more preferably 700 nm or less, and further preferably 300 nm or less. The miniaturization of Si may reduce breakage of Si and may contribute to enhancement of the cycling characteristics, The size of the Si crystallites is preferably as small as possible, and the lower limit of the size of the Si crystallites may not be specifically defined. However, the lower limit of the size of the Si crystallites is preferably 50 nm or more from the standpoint of prevention of decrease of the capacity due to oxidation of Si.

The size of the Si crystallites herein is an average value of the sizes of the Si crystallites obtained by measuring 20 pieces of Si crystallites that are arbitrarily selected from a fine structure micrograph (single view) of the negative electrode active material.

In the negative electrode active material, the Si phase is contained in a range of from 35 to 80% in terms of an area ratio with respect to the entire active material.

When the content of the Si phase is less than 35% in terms of the area ratio, the capacity of the negative electrode active material is decreased, thereby diminishing the significance as the substitute material of graphite. When the content of Si phase exceeds 80% in terms of the area ratio, on the other hand, the proportion of the matrix phase is relatively small to diminish the advantages provided by the matrix phase, such as the maintenance of the Si phase with the matrix phase, thereby lowering the cycling characteristics. When the content of Si is from 35 to 80% in terms of the area ratio, both a large capacity and good cycling characteristics may be achieved in a well balanced manner, The area ratio of the Si phase is more preferably from 50 to 80%, by which the capacity (initial capacity) of the negative electrode active material can be further increased.

In the negative electrode active material, the Sn—Cu compound phase constituting the matrix phase preferably contains Sn in an amount of 50% by mass or more, more preferably 55% by mass or more, and further preferably 60% by mass or more, in the Sn—Cu compound phase, from the standpoint of enhancing the capacity utilization factor with respect to the theoretical capacity of the active material.

Incidentally, there is a case where an Sn phase is unavoidably crystallized in the matrix phase. Even in such a case, according to the invention, the amount of the Sn phase is set to be 15% or less in terms of an area ratio with respect to the entire matrix phase.

In the negative electrode active material, the Si—Fe compound phase is crystallized around the Si phase. By crystallizing the Si—Fe compound phase, the breakage of the Si phase can be further suppressed by the Si—Fe compound phase as well as the Sn—Cu compound phase, thereby enhancing the cycling characteristics.

The form of the negative electrode active material is not particularly limited, and specific examples thereof include flakes and powder. The form of the negative electrode active material is preferably powder from the standpoint of easy applicability for the production of a negative electrode. The negative electrode active material may be dispersed in a suitable solvent.

The upper limit of the size (particle diameter) of the negative electrode active material is preferably 75 μm or less, more preferably 50 μm or less, and further preferably 25 μm or less. When the particle diameter is too large, it is difficult to diffuse Li into the interior of the active material, which provides a tendency that the capacity utilization factor with respect to the theoretical capacity of the active material may be lowered. Furthermore, the diffusion path of Li inside the particle may be prolonged, thereby deteriorating the input-output characteristics, The lower limit of the size (particle diameter) of the negative electrode active material is preferably 100 nm or more, more preferably 500 nm or more, and further preferably 1 μm or more. When the particle diameter is too small, the particles tends to be oxidized, which causes decrease of the capacity and increase of the irreversible capacity.

The size of the negative electrode active material is particularly preferably in a range of from 1 to 10 μm in terms of average particle size (d50) from the standpoint of enhancing the cycling characteristics.

The size of the negative electrode active material may be measured with a laser diffraction-scattering particle size distribution measuring device, The production method of the negative electrode active material will be described. Examples of the production method of the negative electrode active material include a method including a step of quenching an alloy melt containing Si, Sn, Fe and Cu, thereby forming a quenched alloy.

In the case where the quenched alloy is not in the form of powder, or in the case where the particle diameter thereof is to be reduced, a step of pulverizing the quenched alloy with a suitable pulverizing device to make it in the form of powder may be added. Furthermore, according to the necessity, a step of suitably controlling the particle size by classifying the resulting quenched alloy may be added.

Especially, in the case where the quenched alloy, i.e., the active material, is formed into powder, a gas atomizing method described later may be preferably employed as the production method, and it is preferable that the gas atomized powder (or powder produced by other methods, which may be used) is pulverized to provide fine powder of the quenched alloy having an average particle diameter (d50) of from 1 to 10 μm from the standpoint of further enhancing the cycling characteristics.

In the production method, the alloy melt may be specifically prepared, for example, by weighing the raw materials to provide the prescribed chemical composition, and melting the raw materials thus weighed with a suitable measure, such as an arc furnace, a high frequency induction furnace or a heating furnace.

Examples of the method of quenching the alloy melt include liquid atomizing methods such as a roll quenching method (such as a single roll quenching method and a twin roll quenching method), an atomizing method (such as a gas atomizing method, a water atomizing method and a centrifugal atomizing method). A gas atomizing method is preferably employed from the standpoint of enhancing the productivity or the like. The maximum quenching rate of the alloy melt is preferably $10^3$ K/sec or more, and more preferably $10^6$ K/sec or more, from the standpoint of facilitating formation of the fine structure.

A specific example of the production method of the negative electrode active material using an alloy melt containing Si, Sn, Fe and Cu will be described below.

In the case where an atomizing method is applied, a gas, such as $N_2$, Ar or He, is blown at a high pressure (for example, from 1 to 10 MPa) onto the alloy melt, which is discharged into an atomization chamber and flows downward continuously (in a bar form), thereby cooling the melt while pulverizing the same. The cooled melt in a semi-molten state comes into a spherical shape while free-falling in the atomization chamber, whereby the negative electrode active material in the form of powder is obtained. High-pressure water may be blown onto the alloy melt instead of the gas from the standpoint of enhancing the cooling efficiency.

In the case of a roll quenching method is applied, the alloy melt, which is discharged into a chamber, such as a quenching and recovery chamber, and flows downward continuously (in a bar form), is cooled on a rotation roll (formed of such a material as Cu and Fe, which may have plating on the surface of the roll), which is rotated at a peripheral velocity of approximately from 10 to 100 msec. The alloy melt thus cooled on the surface of the roll is formed into an alloy material in the form of a foil or flakes. In this case, the alloy material may be pulverized with a suitable pulverizing device, such as a ball mill, a disk mill, a coffee mill or a mortar, and may further be classified according to the necessity, whereby the negative electrode active material in the form of powder is obtained.

2. Negative Electrode

The negative electrode is constituted by using the negative electrode active material.

Specifically, the negative electrode may contain an electroconductive substrate and an electroconductive film, which is laminated on the surface of the electroconductive substrate. The electroconductive film may contain at least the abovementioned negative electrode active material in a binder. The electroconductive film may further contain, according to the necessity, an electroconductive aid. The addition of an electroconductive aid facilitates securement of an electroconductive path of electrons.

The electroconductive film may contain an aggregate according to the necessity. The inclusion of an aggregate facilitates suppression of expansion and contraction of the negative electrode upon battery charge and discharge, which prevents breakage of the negative electrode, and thus the cycling characteristics can be further enhanced.

The electroconductive substrate functions as a collector. Examples of the material thereof include Cu, a Cu alloy, Ni, a Ni alloy, Fe and a Fe alloy, and preferably Cu and a Cu alloy. Specific examples of the form of the electroconductive substrate include a foil and a plate, and preferably a foil since the volume of the battery can be reduced, and the degree of freedom in shape is increased.

Preferred examples of the material of the binder include a fluorine resin, such as a polyvinylidene fluoride (PVdF) resin and polytetrafluoroethylene, a polyvinyl alcohol resin, a polyimide resin, a polyamide resin, a polyamideimide resin, styrene-butadiene rubber (SBR) and polyacrylic acid. These materials may be used solely or as a combination of two or more kinds thereof. Among these, a polyimide resin is particularly preferred since it has a large mechanical strength, well withstands against volume expansion of the active material, and favorably prevents drop-off of the electroconcluctive film from the collector due to breakage of the binder.

Examples of the electroconductive aid include carbon black, such as Ketjen black, acetylene black and furnace black, graphite, carbon nanotubes and fullerene. These materials may be used solely or as a combination of two or more kinds thereof. Among these, Ketjen black, acetylene black and the like may be preferably used since the electroconductivity can be secured easily.

The content of the electroconductive aid is preferably from 0 to 30 parts by mass, and more preferably from 4 to 13 parts by mass, per 100 parts by mass of the negative electrode active material, from the standpoint of enhancement of the electroconductivity and the electrode capacity. The average particle diameter of the electroconductive aid is preferably from 10 nm to 1 μm, and more preferably from 20 to 50 nm, from the standpoint of the dispersibility and the handleability.

The aggregate is preferably such a material that undergoes no expansion and contraction or very small expansion and contraction upon battery charge and discharge. Examples of the material therefor include graphite, alumina, calcia, zirconia and activated carbon. These materials may be used solely or as a combination of two or more kinds thereof. Among these, graphite and the like are preferably used from the standpoint of the electroconductivity and the Li activity.

The content of the aggregate is preferably from 10 to 400 parts by mass, and more preferably from 43 to 100 parts by mass, per 100 parts by mass of the negative electrode active material, from the standpoint of enhancement of the cycling characteristics and the like. The average particle diameter of the aggregate is preferably from 10 to 50 μm, and more preferably from 20 to 30 μm, from the standpoint of the functionality as aggregate and the control of the thickness of the electrode film. The average particle diameter of the aggregate is a value measured with a laser diffraction-scattering particle size distribution measuring device.

The negative electrode may be produced, for example, in the following mariner. The negative electrode active material, and optionally, the electroconductive aid and the aggregate are added in necessary amounts to the binder dissolved in a suitable solvent, thereby preparing a paste. The paste is then coated on the surface of the electroconductive substrate, dried, and optionally subjected to various treatments, such as consolidation and heat treatment, Upon producing a lithium ion battery by using the negative electrode, other basic constitutional components than the negative electrode, i.e., a positive electrode, an electrolyte, a separator and the like, are not particularly limited.

Specific examples of the positive electrode include an electrode in which a layer containing a positive electrode active material, such as $LiCoO_2$, $LiNiO_2$, $LiFePO_4$ and $LiMnO_2$, is formed on a surface of a collector such as an aluminum foil, Specific examples of the electrolyte include an electrolytic solution in which a lithium salt is dissolved in a non-aqueous solvent, and also include an electrolyte in which a lithium salt is dissolved in a polymer, and a polymer solid electrolyte containing a polymer impregnated with the electrolytic solution.

Specific examples of the non-aqueous solvent include ethylene carbonate, propylene carbonate, butylene carbonate, dimethyl carbonate, diethyl carbonate and methyl ethyl carbonate. These solvents may be used solely, or two or more kinds thereof may be contained.

Examples of the lithium salt include $LiPF_6$, $LiBF_4$, $LiClO_4$, $LiCF_3SO_3$ and $LiAsF_3$. These lithium salts may be used solely, or two or more kinds thereof may be contained.

Examples of the other constitutional components of the battery include a separator, a canister (a battery case), a gasket and the like, each of which may be any one that has been ordinarily used in lithium ion batteries and may be appropriately combined for constituting the battery.

The form of the battery is not particularly limited, and examples thereof include a cylindrical shape, a rectangular shape, a coin shape and the like, each of which may be any one that has been ordinarily used in lithium ion batteries and may be appropriately selected depending on the purpose of the battery.

EXAMPLES

The invention will be described in more detail with reference to examples below. The percentages for the alloy compositions and the alloy mixing ratios are percentages by mass unless otherwise indicated.

1. Production of Negative Electrode Active Material

The raw materials were weighed to make the alloy compositions shown in Table 1 below. The raw materials thus weighed were melted by heating in a high frequency induction furnace to prepare alloy melts. Negative electrode active materials were produced from the resulting alloy melts by a gas atomizing method. The atmosphere upon producing the alloy melts and performing the gas atomization was an argon atmosphere. Upon performing the gas atomization, argon gas was blown at a high pressure (4 MPa) onto the alloy melt, which flowed downward continuously into a bar form in the atomization chamber.

The resulting powder was classified into 25 μm or less with a sieve, thereby preparing the target active material.

Table 1 shows the average particle sizes (d50) of the active materials measured with a laser diffraction-scattering particle size distribution measuring device.

In Examples 1 to 6, the atomized powder obtained by classifying into 25 μm or less was further pulverized finely with a planetary ball mill, thereby preparing the target active material, 2. Structure Observation of Negative Electrode Active Material The negative electrode active materials of Examples and Comparative Examples were observed for the structures thereof with a scanning electron microscope (SEM), and also subjected to elemental analysis by energy dispersive X-ray spectroscopy (EDX) and analysis by X-ray diffraction (XRD).

FIG. 1A shows a secondary electron image by SEM of the negative electrode active material of Example 7, which is a representative example of a negative electrode active material, in which the Si phase is dispersed in the matrix phase, and the matrix phase contains the Si—Fe compound phase crystallized around the Si phase and further contains the Sn—Cu phase crystallized to surround the Si phase and the Si—Fe compound phase.

FIG. 1B shows a secondary electron image by SEM of the negative electrode active material of Comparative Example 1.

FIG. 2 shows the analysis results of XRD of the negative electrode active material of Example 7.

FIG. 1C is an enlarged schematic illustration of the part (surrounded with the dotted line square) of FIG. 1A, Si—Fe compound and the Sn—Cu compound, and the matrix phase thereof further contains the Sn phase.

The XRD analysis was performed by using a Co tube and measuring within an angle range of from 120° to 20° at a speed of 20° per 1 minute.

The negative electrode active materials were measured for the size of the Si crystallites. The size of the Si crystallites herein was an average value of the sizes of the Si crystallites obtained by measuring 20 pieces of Si crystallites that were arbitrarily selected from an SEM image (single view).

The results are shown in Table 1.

| | | | Area ratio (%) | | | | Negative electrode active material | | | |
|---|---|---|---|---|---|---|---|---|---|---|---|
| | | | Ratio in the entire powder | | Ratio in the matrix phase | | | Particle diameter | Size of Si | Production method | Pulverization step |
| | | Alloy system | Si | Matrix | Si-Fe compound | Sn-Cu compound | Sn | (μm) | (μm) | | |
| Example | 1 | SiSnFeCu 49.9Si—24.8Sn—8.8Fe—16.5Cu | 67 | 33 | 40 | 48 | 12 | 4.7 | 1.0 | Gas Atomizing | Present |
| | 2 | SiSnFeCu 55.8Si—17.7Sn—14.7Fe—11.8Cu | 65 | 35 | 60 | 31 | 9 | 4.6 | 1.2 | Gas Atomizing | Present |
| | 3 | SiSnFeCu 58.7Si—14.2Sn—17.7Fe—9.4Cu | 64 | 36 | 64 | 28 | 8 | 4.9 | 1.1 | Gas Atomizing | Present |
| | 4 | SiSnFeCu 61.7Si—10.6Sn—20.6Fe—7.1Cu | 63 | 37 | 78 | 14 | 8 | 4.8 | 1.1 | Gas Atomizing | Present |
| | 5 | SiSnFeCu 63.1Si—8.9Sn—22.1Fe—5.9Cu | 63 | 37 | 84 | 11 | 5 | 4.7 | 1.0 | Gas Atomizing | Present |
| | 6 | SiSnFeCu 64.6Si—7.1Sn—23.6Fe—4.7Cu | 63 | 37 | 86 | 8 | 5 | 4.6 | 1.2 | Gas Atomizing | Present |
| | 7 | SiSnFeCu 49.9Si—24.8Sn—8.8Fe—16.5Cu | 67 | 33 | 40 | 52 | 9 | 17.8 | 1.0 | Gas Atomizing | Absent |
| | 8 | SiSnFeCu 55.8Si—17.7Sn—14.7Fe—11.8Cu | 65 | 35 | 60 | 31 | 9 | 18.0 | 1.2 | Gas Atomizing | Absent |
| | 9 | SiSnFeCu 58.7Si—14.2Sn—17.7Fe—9.4Cu | 64 | 36 | 64 | 25 | 11 | 16.9 | 1.1 | Gas Atomizing | Absent |
| | 10 | SiSnFeCu 61.7Si—10.6Sn—20.6Fe—7.1Cu | 63 | 37 | 78 | 14 | 8 | 17.1 | 1.1 | Gas Atomizing | Absent |
| | 21 | SiSnFeCu 61.7Si—8.7Sn—20.7Fe—9Cu | 63 | 37 | 78 | 17 | 5 | 17.2 | 1.0 | Gas Atomizing | Absent |
| | 22 | SiSnFeCu 61.7Si—6.5Sn—20.7Fe—11.1Cu | 63 | 37 | 78 | 20 | 2 | 17.1 | 1.0 | Gas Atomizing | Absent |
| | 11 | SiSnFeCu 63.1Si—8.9Sn—22.1Fe—5.9Cu | 63 | 37 | 84 | 11 | 5 | 17.8 | 1.0 | Gas Atomizing | Absent |
| | 12 | SiSnFeCu 64.6Si—7.1Sn—23.6Fe—4.7Cu | 63 | 37 | 86 | 8 | 5 | 16.8 | 1.2 | Gas Atomizing | Absent |
| | 13 | SiSnFeCu 32Si—33.6Sn—12Fe—22.4Cu | 42 | 58 | 40 | 52 | 9 | 17.8 | 0.3 | Gas Atomizing | Absent |
| | 14 | SiSnFeCu 40Si—24Sn—20Fe—16Cu | 40 | 60 | 61 | 32 | 7 | 16.8 | 0.3 | Gas Atomizing | Absent |
| | 15 | SiSnFeCu 48Si—14.4Sn—28Fe—9.6Cu | 38 | 62 | 78 | 15 | 6 | 18.0 | 0.2 | Gas Atomizing | Absent |
| | 16 | SiSnFeCu 64.6Si—7.1Sn—23.6Fe—4.7Cu | 37 | 63 | 87 | 8 | 5 | 16.9 | 0.3 | Gas Atomizing | Absent |
| | 17 | SiSnFeCu 43.1Si—28.1Sn—10Fe—18.8Cu | 59 | 41 | 40 | 54 | 7 | 18.1 | 0.5 | Gas Atomizing | Absent |
| | 18 | SiSnFeCu 49.8Si—20.1Sn—16.7Fe—13.4Cu | 57 | 43 | 61 | 33 | 7 | 17.5 | 0.6 | Gas Atomizing | Absent |
| | 19 | SiSnFeCu 56.5Si—12.1Sn—23.4Fe—8Cu | 55 | 45 | 78 | 16 | 7 | 16.7 | 0.7 | Gas Atomizing | Absent |
| | 23 | SiSnFeCu 56.5Si—9.8Sn—23.4Fe—10.3Cu | 55 | 45 | 78 | 19 | 4 | 16.8 | 0.7 | Gas Atomizing | Absent |
| | 24 | SiSnFeCu 56.5Si—7.4Sn—23.4Fe—12.7Cu | 55 | 45 | 78 | 21 | 2 | 16.9 | 0.6 | Gas Atomizing | Absent |
| | 20 | SiSnFeCu 64.6Si—7.1Sn—23.6Fe—4.7Cu | 54 | 46 | 85 | 11 | 2 | 17.1 | 0.5 | Gas Atomizing | Absent |
| Comparative Example | 1 | SiSnFeCu 50Si—36.2Sn—9Fe—4.8Cu | 66 | 34 | 23 | 14 | 63 | 17.2 | 1.1 | Gas Atomizing | Absent |
| | 2 | SiSn 50Si—50Sn | 86 | 14 | 0 | 0 | 100 | 16.8 | 1.4 | Gas Atomizing | Absent |
| | 3 | SiSnFeCu 44Si—31.9Sn—2.9Fe—21.2Cu | 69 | 31 | 15 | 71 | 13 | 16.5 | 1.1 | Gas Atomizing | Absent |
| | 4 | SiSnFeCu 67.6Si—3.5Sn—26.5Fe—2.4Cu | 62 | 38 | 95 | 5 | 3 | 16.7 | 0.9 | Gas Atomizing | Absent |
| | 5 | SiSnFeCu 36.4Si—36.2Sn—3.3Fe—24.1Cu | 62 | 38 | 15 | 74 | 11 | 17.6 | 0.6 | Gas Atomizing | Absent |
| | 6 | SiSnFeCu 63Si—4Sn—30.1Fe—2.7Cu | 53 | 47 | 93 | 4 | 2 | 16.9 | 0.5 | Gas Atomizing | Absent |

It is understood from FIG. 1A that the negative electrode active material of Example 7 has such a structure that the Si phase is dispersed as many domains in the matrix phase, the Si—Fe compound phase is crystallized around the Si phase, and the Sn—Cu compound phase is crystallized to surround the entire of the Si phase and the Si—Fe compound phase.

The negative electrode active material of Comparative Example 1 has such a structure that the Si—Fe compound phase is crystallized as a matrix phase around the Si phase, and the Sn—Cu compound phase is also crystallized as a matrix phase to surround the entire of the Si phase and the Si—Fe compound phase, but the negative electrode active material of Example 7 has such a structure that the Si—Fe compound phase is crystallized around the Si phase in a larger amount than in the negative electrode active material of Comparative Example 1.

In the XRD analysis results shown in FIG. 2, the peaks inherent to Si, the Si—Fe compound, the Sn—Cu compound and Sn are respectively found, and thus it is revealed that the structure shown in FIG. 1A contains the phases of Si, the 3. Measurement of Area Ratios of Each Phases in Negative Electrode Active Material The area ratios of the Si phase, the Si—Fe compound phase, the Sn—Cu compound phase and the Sn phase crystallized in the negative electrode active materials of Examples and Comparative Examples were obtained in the following manner, The area ratio of the Si phase herein is in terms of the area ratio with respect to the entire active material, and the area ratios of the Si—Fe compound phase, the Sn—Cu compound phase and the Sn phase herein are in terms of the area ratio with respect to the entire matrix phase.

The cross sectional structure of the negative electrode active material (magnification: 5,000) was subjected to elemental analysis for Si, Fn, Sn and Cu with an EPMA (electron probe microanalyzer) device for measuring the density distributions of the elements.

The data obtained by the EPMA analysis were subjected to image analysis for measuring the areas of the respective phases, and the area ratios of them were calculated from the areas, The image analysis was performed with an image analysis software, WinRoof, available from Mitani Corporation.

Figure 3A:
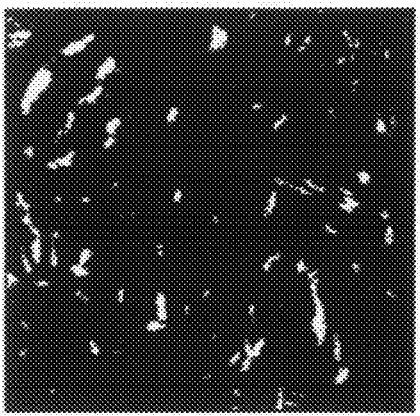
Figure 3C:
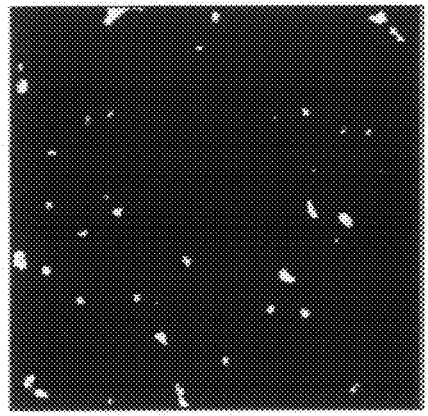

As a representative example, the image analysis results of the negative electrode active material of Example 7 are shown in FIGS. 3A to 3C.

The method for obtaining the area ratios were specifically as follows,

In the results of the EPMA analysis, the area with an Fe amount (density) of from 25 to 50% by mass was designated as an area where the Si—Fe compound ($Si_2Fe$) phase was present, the area with a Cu amount (density) of from 30 to 45% by mass was designated as an area where the Sn—Cu compound ($Sn_5Cu_6$) phase was present, and the area with an Sn amount (density) of from 90 to 100% by mass was designated as an area where the Sn phase was present. The area obtained by subtracting the areas of the Si—Fe compound phase, the Sn—Cu compound phase and the Sn phase from the total area was designated as the area of the Si phase.

$Si_2Fe$ phase: area with Fe amount of from 25 to 50% by mass in Fe analysis result $Sn_5Cu_6$ phase: area with Cu amount of from 30 to 45% by mass in Cu analysis result Sn phase: area with Sn amount of from 90 to 100% by mass in Sn analysis result Si phase: area obtained by subtracting $Si_2Fe$, $Sn_5Cu_6$ and Sn phases from total area Table 2 shows the measured areas of the phases and the area ratios thereof calculated therefrom of the negative electrode active material of Example 7 as a representative example.

The area ratio was calculated for images of five views per one kind of the active material powder, and the average value obtained therefrom was designated as the area ratio shown in Table 1.

The crystallized phases were indentified by XRD and SEM-EDX, and thereby it was confirmed that the phases were crystallized within the analyzed area.

TABLE 2

Calculated Results of Area Ratio

| | Area (µm$^2$) | Area ratio (%) | Area ratio in matrix phase (%) |
|---|---|---|---|
| Si | 88.2 | 67 | — |
| Si—Fe compound | 17.2 | 13 | 40 |
| Sn—Cu compound $Sn_5Cu_6$ | 22.5 | 17 | 52 |
| Sn | 4 | 3 | 9 |
| Total | 131.9 | 100 | 100 |

4. Evaluation of Negative Electrode Active Material 4.1 Production of Coin Battery for Charge and Discharge Test 100 parts by mass of the negative electrode active material, 6 parts by mass of acetylene black (produced by Denki Kagaku Kogyo K.K., d50=36 nm) as an electroconductive aid and 19 parts by mass of a polyimide binder (thermoplastic resin) as a binder were mixed, and further mixed with N-methyl-2-pyrrolidone (NMP) as a solvent, thereby producing a paste containing the negative electrode active material.

A coin half cell was produced in the following manner. For simple evaluation herein, an electrode produced with the negative electrode active material was used as a test electrode, and a Li foil was used as a counter electrode. On a surface of a copper foil (thickness: 18 µm) as a negative electrode collector, the paste was coated to a thickness of 50 µm by a doctor blade method, and then dried, thereby forming a negative electrode active material layer. After forming the negative electrode active material layer, the layer was subjected to consolidation with a roll press. Thus, test electrodes of Examples and Comparative Examples were produced.

The test electrodes of Examples and Comparative Examples were each punched out into a disk shape having a diameter of 11 mm and were subjected to the test.

A Li foil (thickness: 500 µm) was punched out into substantially the same shape as the test electrodes and was used as a positive electrode. $LiPF_6$ was dissolved to a concentration of 1 mol/L in a mixed solvent obtained by mixing the same amounts of ethylene carbonate (EC) and diethyl carbonate (DEC), thereby preparing a non-aqueous electrolytic solution.

The test electrode was housed in a positive electrode canister (the test electrode is to be a negative electrode in a lithium secondary battery, but is used as a positive electrode when a Li foil is used as the counter electrode, which functions as a negative electrode), and the counter electrode was housed in a negative electrode canister. A polyolefin fine porous film as a separator was inserted between the test electrode and the counter electrode.

The non-aqueous electrolytic solution was charged into the canisters, and the negative electrode canister and the positive electrode canister were fixed by crimping.

4.2 Battery Charge and Discharge Test

The coin half cell was subjected to constant current charge and discharge at a electric current of 0.2 mA by one cycle, and the discharge capacity herein was designated as an initial capacity Co. In the second cycle and later, the charge and discharge test was performed at 1/5 C rate (C rate: An electric current for charging (or discharging) an electric quantity $C_0$, which is required for charging (or discharging) the electrode, for one hour is designated as 1 C, i,e., charge (or discharge) is performed for 12 minutes with 5 C and for 5 hours with 1/5 C). The capacity (mAh) used for discharging herein was divided by the amount of the active material (g), thereby providing the discharge capacity (mAh/g).

In the example, the charge and discharge cycle was repeated 100 times, thereby evaluating the cycling characteristics.

The capacity retention ratio was calculated from the discharge capacity.

capacity retention ratio after 50 cycles={(discharge capacity after 50 cycles)/(initial discharge capacity (discharge capacity in first cycle))}×100 capacity retention ratio after 100 cycles={(discharge capacity after 100 cycles)/(initial discharge capacity (discharge capacity in first cycle))}×100

Figure 4:
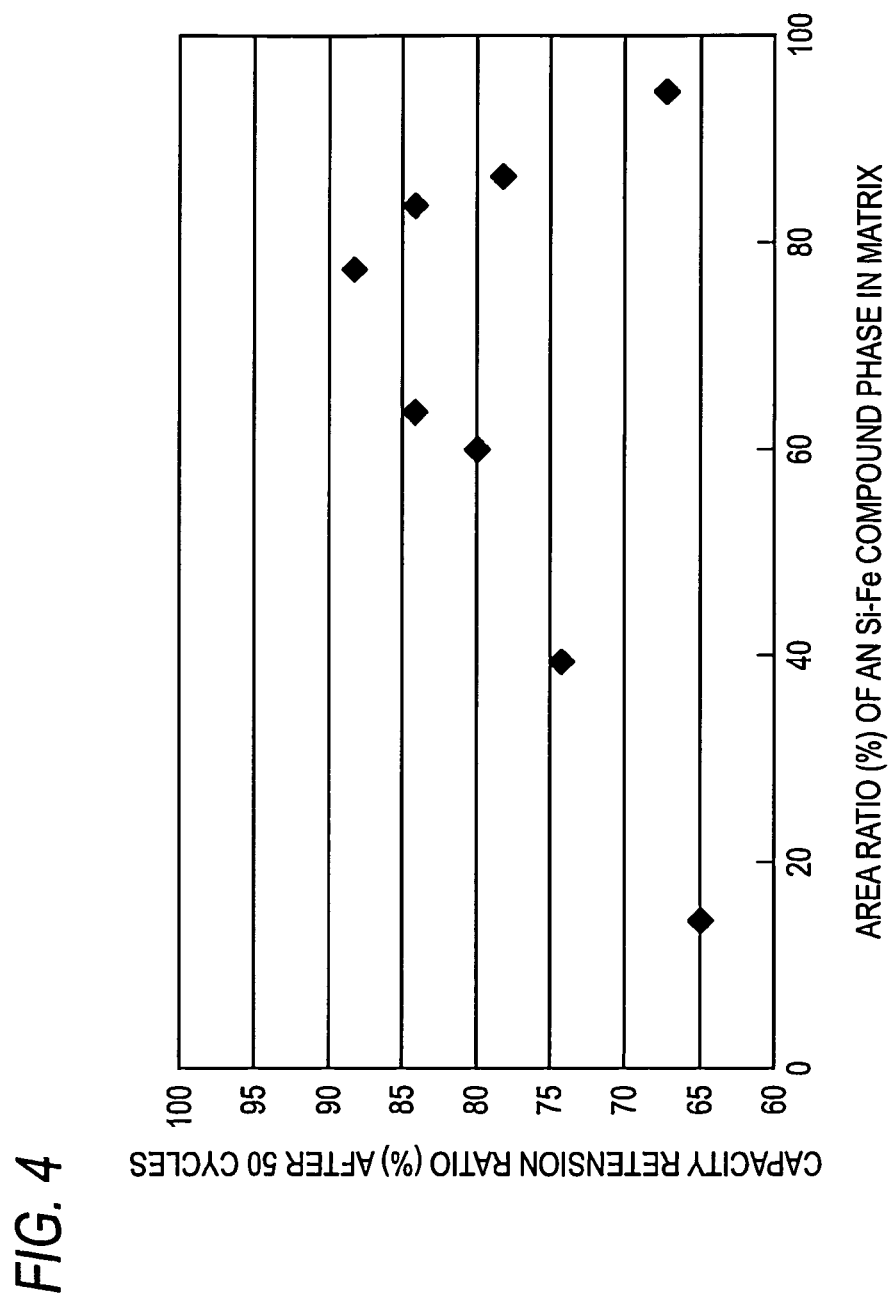
FIG. 4 is a graph showing relationship between an area ratio of an Si—Fe compound phase and a capacity retention ratio after 50 cycles.

The results are shown in Table 3 and FIG. 4.

TABLE 3

| | | Alloy system | | Binder used for evaluation | discharge capacity (mAh/g) Initial 500 or more | capacity retention ratio (%) | | |
|---|---|---|---|---|---|---|---|---|
| | | Target value | Composition (mass %) | | | Initial | 50 cycles 70 or more | 100 cycles |
| Ex. | 1 | SiSnFeCu | 49.9Si—24.8Sn—8.8Fe—16.5Cu | Polyimide | 1248 | 100 | 93 | 86 |
| | 2 | SiSnFeCu | 55.8Si—17.7Sn—14.7Fe—11.8Cu | Polyimide | 1203 | 100 | 94 | 87 |
| | 3 | SiSnFeCu | 58.7Si—14.2Sn—17.7Fe—9.4Cu | Polyimide | 1178 | 100 | 95 | 90 |

TABLE 3-continued

| | | Alloy system | | Binder used | discharge capacity (mAh/g) Initial | capacity retention ratio (%) | 50 cycles | |
|---|---|---|---|---|---|---|---|---|
| | | Target value | Composition (mass %) | for evaluation | 500 or more | Initial | 70 or more | 100 cycles |
| | 4 | SiSnFeCu | 61.7Si—10.6Sn—20.6Fe—7.1Cu | Polyimide | 1169 | 100 | 96 | 95 |
| | 5 | SiSnFeCu | 63.1Si—8.9Sn—22.1Fe—5.9Cu | Polyimide | 1150 | 100 | 95 | 92 |
| | 6 | SiSnFeCu | 64.6Si—7.1Sn—23.6Fe—4.7Cu | Polyimide | 1147 | 100 | 95 | 88 |
| | 7 | SiSnFeCu | 49.9Si—24.8Sn—8.8Fe—16.5Cu | Polyimide | 1574 | 100 | 74 | 59 |
| | 8 | SiSnFeCu | 55.8Si—17.7Sn—14.7Fe—11.8Cu | Polyimide | 1480 | 100 | 80 | 61 |
| | 9 | SiSnFeCu | 58.7Si—14.2Sn—17.7Fe—9.4Cu | Polyimide | 1333 | 100 | 84 | 65 |
| | 10 | SiSnFeCu | 61.7Si—10.6Sn—20.6Fe—7.1Cu | Polyimide | 1260 | 100 | 88 | 70 |
| | 21 | SiSnFeCu | 61.7Si—8.7Sn—20.7Fe—9Cu | Polyimide | 1235 | 100 | 91 | 75 |
| | 22 | SiSnFeCu | 61.7Si—6.5Sn—20.7Fe—11.1Cu | Polyimide | 1201 | 100 | 93 | 79 |
| | 11 | SiSnFeCu | 63.1Si—8.9Sn—22.1Fe—5.9Cu | Polyimide | 1233 | 100 | 84 | 67 |
| | 12 | SiSnFeCu | 64.6Si—7.1Sn—23.6Fe—4.7Cu | Polyimide | 1232 | 100 | 78 | 62 |
| | 13 | SiSnFeCu | 32Si—33.6Sn—12Fe—22.4Cu | Polyimide | 763 | I00 | 92 | 89 |
| | 14 | SiSnFeCu | 40Si—24Sn—20Fe—16Cu | Polyimide | 647 | 100 | 95 | 93 |
| | 15 | SiSnFeCu | 48Si—14.4Sn—28Fe—9.6Cu | Polyimide | 540 | 100 | 98 | 98 |
| | 16 | SiSnFeCu | 64.6Si—7.1Sn—23.6Fe—4.7Cu | Polyimide | 510 | 100 | 96 | 94 |
| | 17 | SiSnFeCu | 43.1Si—28.1Sn—10Fe—18.8Cu | Polyimide | 1332 | 100 | 78 | 67 |
| | 18 | SiSnFeCu | 49.8Si—20.1.Sn—16.7Fe—13.4Cu | Polyimide | 1236 | 100 | 85 | 67 |
| | 19 | SiSnFeCu | 56.5Si—12.1Sn—23.4Fe—8Cu | Polyimide | 1069 | 100 | 90 | 72 |
| | 23 | SiSnFeCu | 56.5Si—9.8Sn—23.4Fe—10.3Cu | Polyimide | 1042 | 100 | 92 | 18 |
| | 24 | SiSnFeCu | 56.5Si—7.48Sn—23.4Fe—12.7Cu | Polyimide | 1011 | 100 | 94 | 81 |
| | 20 | SiSnFeCu | 64.6Si—7.1Sn—23.6Fe—4.7Cu | Polyimide | 1034 | 100 | 86 | 69 |
| Comp. | 1 | SiSnFeCu | 50Si—36.2Sn—9Fe—4.8Cu | Polyimide | 1952 | 100 | 62 | 41 |
| Ex. | 2 | SiSn | 50Si—50Sn | Polyimide | 2311 | 100 | 10 | 2 |
| | 3 | SiSnFeCu | 44Si—31.9Sn—2.9Fe—21.2Cu | Polyimide | 1935 | 100 | 65 | 49 |
| | 4 | SiSnFeCu | 67.6Si—3.5Sn—26.5Fe—2.4Cu | Polyimide | 1212 | 100 | 67 | 51 |
| | 5 | SiSnFeCu | 36.4Si—36.2Sn—3.3Fe—24.1Cu | Polyimide | 1657 | 100 | 66 | 55 |
| | 6 | SiSnFeCu | 63.2Si—4Sn—30.1Fe—2.7Cu | Polyimide | 998 | 100 | 67 | 59 |

It is understood from the results in Table 3 as follows.

In Comparative Example 1, the area ratio of the Si—Fe compound phase is 23%, which is lower than 35%, the lower limit in the invention, and the area ratio of the Sn phase is as large as 63%. Accordingly, the cycling characteristics are deteriorated.

In Comparative Example 2, the Si—Fe compound phase and the Sn—Cu compound phase are not crystallized, but the overall matrix phase is formed of the Sn phase solely. Accordingly, the cycling characteristics are further deteriorated as compared to Comparative Example 1, In Comparative Example 2, furthermore, the area ratio of the Si phase is as large as 86%, and the area ratio of the matrix phase is small.

In Comparative Example 3, the area ratio of the Si—Fe phase is as small as 15%, and thus the cycling characteristics are deteriorated.

In Comparative Example 4, the area ratio of the Si—Fe phase is 95%, which is excessive, and thus cycling characteristics are deteriorated.

In Comparative Example 5, the area ratio of the Si—Fe phase is as small as 15%, and thus the cycling characteristics are deteriorated.

In Comparative Example 6, the area ratio of the Si—Fe phase is 93%, which is 2 0 excessive, and thus cycling characteristics are deteriorated.

Examples 1 to 24, in which the area ratio of the Si phase is in a range of from 35 to 80%, the Si—Fe compound phase and the Sn—Cu compound phase are crystallized as a matrix phase, the area ratio of the Si—Fe compound phase is in a range of from 35 to 90%, and the area ratio of the Sn phase is 15% or less, satisfy the target initial discharge capacity, 500 rnAh/g or more, and the target capacity retention ratio after 50 cycles, 70% or more, and thus have a large initial discharge capacity and good cycling characteristics.

FIG. 4 shows the relationship between the area ratio of the Si—Fe compound phase and the capacity retention ratio after 50 cycles in Comparative Examples 3 and 4 and Examples 7 to 12. As shown in FIG. 4, when the area ratio of the Si—Fe compound phase in the matrix phase is increased, the capacity retention ratio is increased, and beyond a certain value, the capacity retention ratio is shifted to decrease associated with increase of the area ratio of the Si—Fe compound phase.

As a result, it is understood that the area ratio of the Si—Fe compoundp base is preferably in a range of from 35 to 90%, and when it is in a range of from 60 to 85%, better cycling characteristics may be obtained.

In the results shown in Table 3, Examples 13, 14, 15 and 16, in which the area ratio of the Si phase is smaller than 50%, do not satisfy the more favorable target initial discharge capacity, 1,000 mAh/g, but the other Examples, in which the area ratio of the Si phase is in a range of from 50 to 80%, satisfies the target initial discharge capacity, 1,000 mAh/g. Accordingly, it is understood that a larger initial discharge capacity is obtained when the area ratio of the Si phase is in a range of from 50 to 80%.

Examples 7, 12 and 17, in which the area ratio of the Si—Fe compound phase is outside a range of from 60 to 85%, do not satisfy the more favorable target capacity retention ratio, 80% or more after 50 cycles, but the other Examples, in which the area ratio of the Si—Fe compound phase is in a range of from 60 to 85%, satisfy the target capacity retention ratio, 80% or more, Accordingly, it is understood that better cycling characteristics are obtained when the area ratio of the Si—Fe compound phase is in a range of from 60 to 85%.

It is further understood from the results shown in Table 3 that Examples 1 to 6, in which the gas atomized powder is further pulverized to make the particle diameter (average particle diameter) in a range of from 1 to 10 μm, exhibit particularly high cycling characteristics, The negative electrode active material for a lithium ion battery and the negative electrode for a lithium ion battery according to the invention have been described above, but the invention is not limited to the embodiments and examples mentioned above, and various modifications may be made therein unless the substance of the invention is deviated.

This application is based on Japanese patent application No, 2011-218480 filed Sep. 30, 2011 and Japanese patent application No. 2012-058014 filed Mar. 14, 2012, the entire contents thereof being hereby incorporated by reference.

What is claimed is:

1. A negative electrode active material, comprising:
an Si—Sn—Fe—Cu based alloy,
wherein an Si phase has an area ratio in a range of from 35% to 80% in an entire negative electrode active material,
wherein the Si phase is dispersed in a matrix phase,
wherein the matrix phase comprises an Si—Fe compound phase crystallized around the Si phase and further comprises an Sn—Cu compound phase crystallized to surround the Si phase and the Si—Fe compound phase,
wherein the Si—Fe compound phase is crystallized in a ratio of from 35% to 90% in terms of an area ratio in an entire matrix phase, and
wherein the matrix phase further comprises an Sn phase unavoidably crystallized in the matrix phase in a ratio in a range from greater than 0% to 15% in terms of the area ratio in the entire matrix phase.

2. The negative electrode active material according to claim 1, wherein the area ratio of the Si—Fe compound phase in the entire matrix phase is in a range of from 60% to 85%.

3. The negative electrode active material according to claim 1, wherein the area ratio of the Si phase in the entire negative electrode active material is in a range of from 50% to 80%.

4. The negative electrode active material according to claim 2, wherein the area ratio of the Si phase in the entire negative electrode active material is in a range of from 50% to 80%.

5. A negative electrode for a lithium ion battery, comprising the negative electrode active material according to claim 1 formed into a fine powder having an average particle diameter of from 1 µm to 10 µm and a polyimide binder as a binder for binding the negative electrode active material.

6. The negative electrode for a lithium ion battery according to claim 5, wherein the area ratio of the Si—Fe compound phase in the entire matrix phase is in a range of from 60% to 85%.

7. The negative electrode for a lithium ion battery according to claim 5, wherein the area ratio of the Si phase in the entire negative electrode active material is in a range of from 50% to 80%, 8. The negative electrode for a lithium ion battery according to claim 6, wherein the area ratio of the Si phase in the entire negative electrode active material is in a range of from 50% to 80%.

* * * * *